United States Patent
Chen et al.

(10) Patent No.: US 11,275,845 B2
(45) Date of Patent: Mar. 15, 2022

(54) METHOD AND APPARATUS FOR CLUSTERING PRIVACY DATA OF PLURALITY OF PARTIES

(71) Applicant: Alipay (Hangzhou) Information Technology Co., Ltd., Zhejiang (CN)

(72) Inventors: Chaochao Chen, Zhejiang (CN); Jun Zhou, Zhejiang (CN); Li Wang, Zhejiang (CN); Longfei Zheng, Zhejiang (CN)

(73) Assignee: Alipay (Hangzhou) Information Technology Co., Ltd., Hangzhou (CN)

(*) Notice: Subject to any disclaimer, the term of this patent is extended or adjusted under 35 U.S.C. 154(b) by 0 days.

(21) Appl. No.: 17/353,541

(22) Filed: Jun. 21, 2021

(65) Prior Publication Data

US 2022/0004646 A1    Jan. 6, 2022

(30) Foreign Application Priority Data

Jul. 3, 2020 (CN) .......................... 202010631310.9

(51) Int. Cl.
*G06F 21/60* (2013.01)
*G06F 16/28* (2019.01)

(52) U.S. Cl.
CPC ............ *G06F 21/60* (2013.01); *G06F 16/285* (2019.01)

(58) Field of Classification Search
None
See application file for complete search history.

(56) References Cited

U.S. PATENT DOCUMENTS

2021/0027182 A1* 1/2021 Harris .................... G06N 99/00

FOREIGN PATENT DOCUMENTS

| CN | 110609831 A | 12/2019 |
| CN | 111062487 A | 4/2020 |
| CN | 111143865 A | 5/2020 |

OTHER PUBLICATIONS

Danfeng et al., "Privacy—Preserving K—Means Clustering Algorithm Over Distributed Data," Computing Center Institute, East China Normal University, Shanghai, vol. 36, No. 7, Jul. 2008, 5 pages.

(Continued)

*Primary Examiner* — David R Vincent
(74) *Attorney, Agent, or Firm* — Seed IP Law Group LLP

(57) ABSTRACT

Embodiments of the present specification provide a method and an apparatus for clustering privacy data of a plurality of parties. The method includes: a first party determining a first data part of central data currently corresponding to a cluster of K clusters, where the first data part corresponds to a first dimension set; a second party has a second data part of the central data corresponding to a second dimension set; separately using central data of a cluster of the K clusters as target central data, and obtaining a first segment of a target distance between a sample of the N samples and the target central data through local calculation based on a first feature part of any one of N samples and the first data part of the target central data; determining a shortest target distance among target distances by performing joint comparison using the first segment of each target distance and a second segment of each target distance of the second party through secret sharing; and determining a cluster corresponding to the shortest target distance as a cluster that any sample currently belongs to. As such, leakage of privacy data can be prevented.

20 Claims, 3 Drawing Sheets

(56) References Cited

OTHER PUBLICATIONS

Danfeng, "Research of Privacy-Preserving Clustering Algorithm Over Distributed Data," East China Normal University, Computer Center of SISC, Nov. 2008, 73 pages.

* cited by examiner

METHOD AND APPARATUS FOR CLUSTERING PRIVACY DATA OF PLURALITY OF PARTIES

BACKGROUND

Technical Field

One or more embodiments of the present specification relate to the computer field, and in particular, to a method and an apparatus for clustering privacy data of a plurality of parties.

Description of the Related Art

Clustering is a very common technology in machine learning. It is often applied to tasks such as community discovery and abnormality detection. A common clustering algorithm is an unsupervised learning algorithm, which is intended to group similar objects into the same cluster. Higher similarity of the objects in the cluster indicates a better clustering effect. The biggest difference between clustering and classification is that the purpose of classification is known in advance, but the purpose of clustering is unknown in advance. The result of clustering is the same as that of classification, except that the category is not defined in advance.

In some scenarios, data is distributed vertically in a plurality of parties. The data possessed by each party may be privacy data, that is, the privacy data possessed by one party cannot be disclosed to other parties. In such case, the existing technology does not provide a suitable clustering method.

Therefore, an improved solution is expected to prevent leakage of privacy data when privacy data of a plurality of parties is clustered.

BRIEF SUMMARY

One or more embodiments of the present specification describe a method and an apparatus for clustering privacy data of a plurality of parties, so as to prevent leakage of privacy data when privacy data of a plurality of parties is clustered.

According to a first aspect, a method for clustering privacy data of a plurality of parties is provided, the plurality of parties including a first party and a second party, privacy data of the first party including a first feature part of N samples, and the first feature part corresponding to a first dimension set; privacy data of the second party including a second feature part of the N samples, and the second feature part corresponding to a second dimension set; and the method being performed by the first party, comprising a plurality of rounds of iterative processes, and any one of the plurality of rounds of iterative processes including: determining a first data part of central data currently corresponding to a cluster of K clusters, where the first data part corresponds to the first dimension set; a second data part of the central data corresponding to the second dimension set belongs to the second party; the first data part of the central data and the second data part of the central data jointly form the central data; separately using central data of a cluster of the K clusters as target central data, and obtaining a first segment of a target distance between a sample of the N samples and the target central data through local calculation based on a first feature part of the sample of the N samples and the first data part of the target central data, where a second segment of the target distance is obtained by the second party; determining a shortest target distance among target distances by performing joint comparison using the first segment of each target distance and the second segment of each target distance of the second party through secret sharing; and determining a cluster corresponding to the shortest target distance as a cluster that the sample currently belongs to.

In some possible implementations, the local calculation includes: using the first feature part of the sample as a first sub-vector, using the first data part of the target central data as a second sub-vector, calculating a vector distance between the first sub-vector and the second sub-vector, and determining the vector distance as the first segment of the target distance between the sample and the target central data.

In some possible implementations, in a first round of iteration, first data part of the central data corresponding to a cluster of the K clusters is randomly initialized data.

In some possible implementations, the joint comparison includes:

determining a distance comparison result between the two target distances by performing joint comparison using first segments of two target distances among the target distances and second segments of the two target distances of the second party through secret sharing; and determining the shortest target distance among the target distances based on the distance comparison result.

In some possible implementations, the method further includes: after determining the cluster corresponding to the shortest target distance as the cluster that the sample currently belongs to, updating, based on a feature mean value corresponding to a dimension in first feature data of samples of the cluster, a data value corresponding to the dimension in a first data part of central data of the cluster.

The method further includes: after updating the data value corresponding to the dimension in the first data part of the central data of the cluster, determining whether a change amount of central data of the cluster satisfies a predetermined condition for stopping iteration; and in response to determining that the change amount of the central data of the cluster does not satisfy the predetermined condition for stopping iteration, performing a next round of iteration among the plurality of rounds of iterative processes.

The method further includes: in response to determining that the change amount of the central data of the cluster satisfies the predetermined condition for stopping iteration, determining the cluster that a sample currently belongs to as a cluster that the sample finally belongs to.

Further, determining whether the change amount of the central data of the cluster satisfies the predetermined condition for stopping iteration includes: using a cluster of the clusters as a target cluster, using a first data part of central data of the target cluster before update as a third sub-vector, using a first data part of central data of the target cluster after update as a fourth sub-vector, calculating a first vector distance between the third sub-vector and the fourth sub-vector, and determining a first comparison result between the first vector distance and a first threshold; receiving a second comparison result between a second vector distance and a second threshold from the second party, where the second vector distance is a second vector distance between a fifth sub-vector and a sixth sub-vector, and is calculated by the second party using a second data part of the central data of the target cluster before update as the fifth sub-vector and using a second data part of the central data of the target cluster after update as the sixth sub-vector; and in response to the first comparison result showing that the first vector distance is less than or equal to the first threshold, and the second comparison result showing that the second vector distance is less than or equal to the second threshold, determining that a change amount of central data of the target cluster satisfies the predetermined condition for stopping iteration.

According to a second aspect, an apparatus for clustering privacy data of a plurality of parties is provided, the plurality of parties including a first party and a second party, privacy data of the first party including a first feature part of N samples, and the first feature part corresponding to a first dimension set; privacy data of the second party including a second feature part of the N samples, and the second feature part corresponding to a second dimension set; the apparatus being arranged in the first party, and being configured to perform a plurality of rounds of iterative processes; and the apparatus comprising the following units for performing any round of iteration: a central determination unit, configured to determine a first data part of central data currently corresponding to a cluster of K clusters, where the first data part corresponds to the first dimension set; a second data part of the central data corresponding to the second dimension set belongs to the second party; the first data part of the central data and the second data part of the central data jointly form the central data; a local calculation unit, configured to separately use the central data as target central data, and obtain a first segment of a target distance between a sample of the N samples and the target central data through local calculation based on a first feature part of the sample of the N samples and the first data part of the target central data determined by the central determination unit, where a second segment of the target distance is obtained by the second party; a joint comparison unit, configured to determine a shortest target distance among target distances by performing joint comparison using the first segment of each target distance obtained by the local calculation unit and the second segment of each target distance of the second party through secret sharing; and a cluster determination unit, configured to determine a cluster corresponding to the shortest target distance determined by the joint comparison unit, as a cluster that the sample currently belongs to.

According to a third aspect, a computer-readable storage medium is provided, which stores a computer program. When the computer program is executed on a computer, the computer is enabled to perform the method according to the first aspect.

According to a fourth aspect, a computing device is provided, including a memory and a processor. The memory stores executable code, and the processor executes the executable code to implement the method according to the first aspect.

According to the method and the apparatus provided in the embodiments of the present specification, no party alone determines the central data of a cluster. Instead, the first party determines the first data part of the central data currently corresponding to a cluster of the K clusters, and the first data part corresponds to the first dimension set. The second party determines the second data part of the central data, and the second data part corresponds to the second dimension set. The first data part of any central data and the second data part of the central data jointly form the central data. In addition, when the target distance between a sample of the N samples and the target central data is determined subsequently, the first party determines the first segment of the target distance through local calculation, and the second party determines the second segment of the target distance through local calculation. When the shortest target distance among the target distances is determined, joint comparison with the second party is performed through secret sharing. Finally, the cluster corresponding to the shortest target distance is determined as the cluster that the sample currently belongs to. The entire process is based on secure multi-party calculations, which can prevent leakage of privacy data when the privacy data of a plurality of parties is clustered.

BRIEF DESCRIPTION OF THE SEVERAL VIEWS OF THE DRAWINGS

To describe the technical solutions in the embodiments of the present invention more clearly, the following briefly introduces the accompanying drawings required for describing the embodiments. Clearly, the accompanying drawings in the following description are merely some embodiments of the present invention, and a person of ordinary skill in the art can still derive other drawings from these accompanying drawings without creative efforts.

DETAILED DESCRIPTION

The solutions provided in the present specification are described below with reference to the accompanying drawings.

Figure 1:
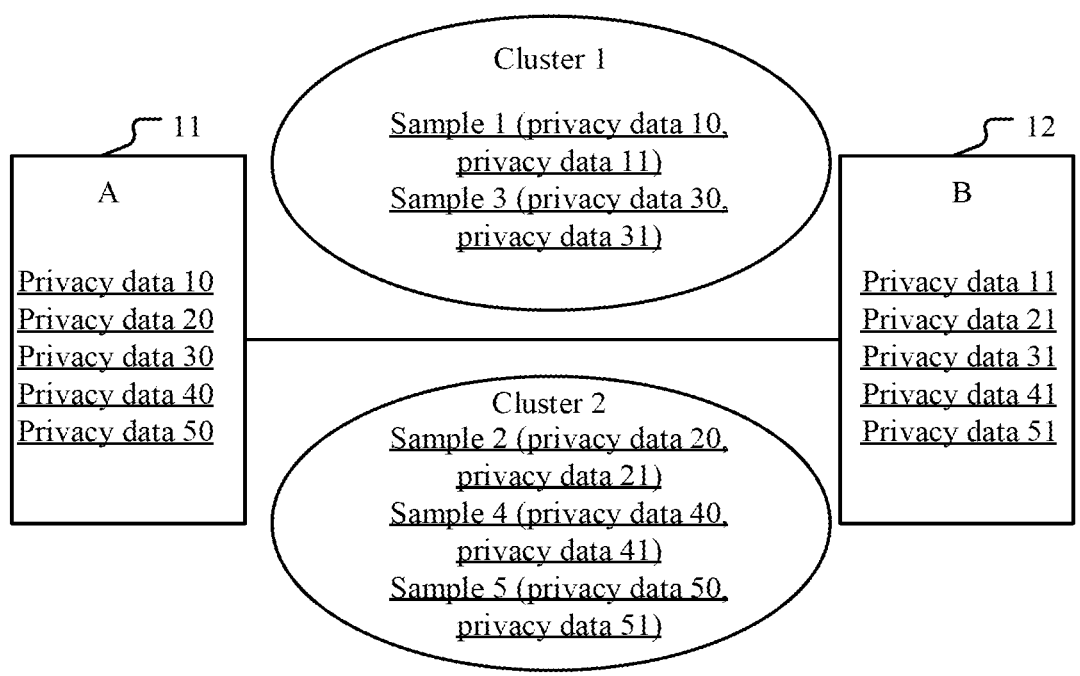
FIG. 1 is a schematic diagram illustrating an implementation scenario according to some embodiments disclosed in the present specification.

FIG. 1 is a schematic diagram illustrating an implementation scenario according to some embodiments disclosed in the present specification. This implementation scenario includes clustering privacy data of a plurality of parties. It can be understood that the plurality of parties herein may be two parties or more than two parties, for example, three parties, four parties, etc. In the embodiments of the present specification, clustering of privacy data of two parties is used as an example for description. Referring to FIG. 1, a first party 9 has privacy data 10, privacy data 20, privacy data 30, privacy data 40, and privacy data 50; a second party 12 has privacy data 11, privacy data 21, privacy data 31, privacy data 41, and privacy data 51. The privacy data of the first party includes a first feature part of samples, and the first feature part corresponds to a first dimension set. The privacy data of the second party includes a second feature part of samples, and the second feature part corresponds to a second dimension set. Sample 1 is used as an example. The privacy data 10 of the first party is a first feature part of sample 1, and the privacy data 11 of the second party is a second feature part of sample 1. The first feature part and the second feature part respectively correspond to some dimensions of sample 1.

It can be understood that the first party and the second party are used only to distinguish between two parties; the first party can alternatively be referred to as party A, the second party can alternatively be referred to as party B, and so on. Assuming there are two parties A and B, and a sample dimension of a sample of N samples is d, where party A has a feature of dimension d1 of the sample, and party B has a feature of dimension d2 of the sample, d=d1+d2. In the embodiments of the present specification, the sample is expected to be securely clustered into K categories (c1, c2, ..., cK), where K can be 2, 3, or a larger number.

In the embodiments of the present specification, the sample includes the privacy data of the first party and the privacy data of the second party. Information covered by the privacy data of each party is not limited, and can be any information that cannot be provided to the outside, for example, a user's personal information, trade secret, etc. For example, privacy data is the user's personal information, including the user's name, age, income, etc. Each item of information in the privacy data can be used as a feature of one dimension of the sample. For details, references can be made to mapping relationships between features included in each sample shown in Table 1.

TABLE 1

Mapping relationships between features included in each sample

| | Name | Age (years) | Income (ten thousand $) | Financing amount (ten thousand $) | Consumption amount (ten thousand $) |
|---|---|---|---|---|---|
| Sample 1 | Tom | 25 | 1.5 | 0.8 | 0.6 |
| Sample 2 | Dick | 26 | 2.2 | 1.0 | 1.2 |
| Sample 3 | Harry | 35 | 0.8 | 0.4 | 0.3 |
| Sample 4 | Bob | 41 | 1.8 | 0.9 | 0.8 |
| Sample 5 | John | 19 | 0.6 | 0.1 | 0.5 |

It can be seen from Table 1 that the data in different columns in Table 1 may be distributed in different parties. For example, the name and the age are distributed in the first party, and the income, the financing amount, and the consumption amount are distributed in the second party. Such data distribution manner, in which the data is vertically distributed in a plurality of parties, can be referred to as vertical segmentation.

In the embodiments of the present specification, privacy data of a plurality of parties is clustered. For example, in FIG. 1, privacy data 10, privacy data 20, privacy data 30, privacy data 40, privacy data 50, privacy data 11, privacy data 21, privacy data 31, privacy data 41, and privacy data 51 are clustered. The privacy data distributed in different parties jointly form a data sample. A sample is finally allocated to a cluster based on not only the privacy data of the first party, but also the privacy data of the second party. In the embodiments of the present specification, the secure multi-party computation (MPC) method is used to cluster the privacy data of a plurality of parties without leaking the privacy data.

Figure 2:
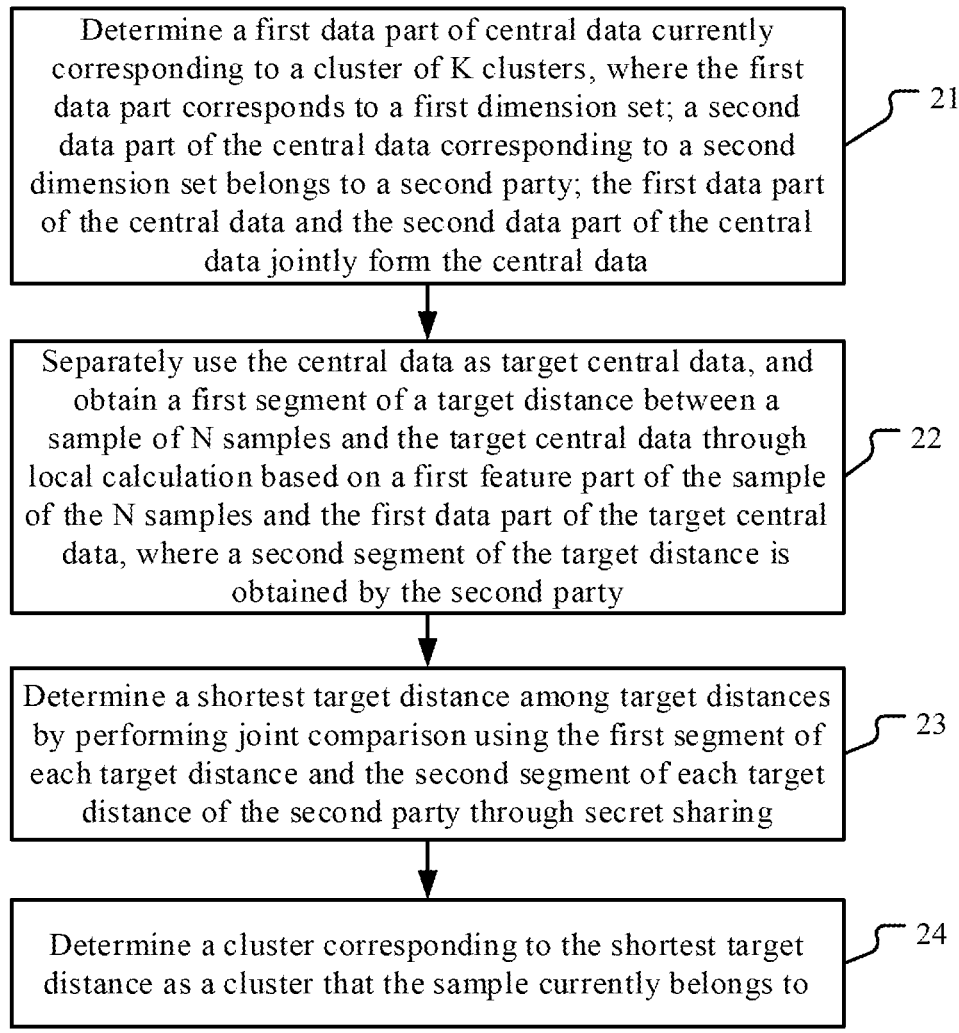
FIG. 2 is a flowchart illustrating a method for clustering privacy data of a plurality of parties according to some embodiments.

FIG. 2 is a flowchart illustrating a method for clustering privacy data of a plurality of parties according to some embodiments. This method can be illustrated using the implementation scenario shown in FIG. 1. The plurality of parties include a first party and a second party. Privacy data of the first party includes a first feature part of N samples, and the first feature part corresponds to a first dimension set. Privacy data of the second party includes a second feature part of the N samples, and the second feature part corresponds to a second dimension set. The method is performed by the first party, and includes a plurality of rounds of iterative processes. As shown in FIG. 2, any round of iteration includes the following steps:

Step 21: Determine a first data part of central data currently corresponding to a cluster of K clusters, where the first data part corresponds to the first dimension set; a second data part of the central data corresponding to the second dimension set belongs to the second party; the first data part of the central data and the second data part of the central data jointly form the central data.

Step 22: Separately use the central data as target central data, and obtain a first segment of a target distance between a sample of the N samples and the target central data through local calculation based on a first feature part of the sample of the N samples and the first data part of the target central data, where a second segment of the target distance is obtained by the second party.

Step 23: Determine a shortest target distance among target distances by performing joint comparison using the first segment of each target distance and the second segment of each target distance of the second party through secret sharing.

Step 24: Determine a cluster corresponding to the shortest target distance as a cluster that the sample currently belongs to. The following describes specific execution methods for the previous steps.

Step 21: Determine a first data part of central data currently corresponding to a cluster of K clusters, where the first data part corresponds to the first dimension set; a second data part of the central data corresponding to the second dimension set belongs to the second party; the first data part of the central data and the second data part of the central data jointly form the central data. It can be understood that a value of K can be predetermined. For example, the value of K is 2, that is, it is predetermined that the privacy data of a plurality of parties is categorized into two clusters.

In the embodiments of the present specification, each cluster corresponds to one piece of central data. The central data is jointly determined by the first party and the second party. The first party can only determine the first data part of the central data, and the first data part corresponds to the first dimension set. The second party determines the second data part of the central data, and the second data part corresponds to the second dimension set. Neither the first party nor the second party can determine the central data alone.

In some examples, in a first round of iteration, first data part of the central data corresponding to a cluster of the K clusters is randomly initialized data.

For example, the number of dimensions included in the first dimension set is d1=2, the number of dimensions included in the second dimension set is d2=3, and the number of clusters is K=2. In such case, the first party and the second party jointly select K samples as initial central data, the first party stores the first two dimensions of the K pieces of central data, and the second party stores the last three dimensions of the K pieces of central data. For example, for central data c1 (c1_1, c1_2, c1_3, c1_4, c1_5), the first party stores (c1_1, c1_2), and the second party stores (c1_3, c1_4, c1_5).

Further, the first party can initialize one K-dimensional cluster vector for each sample to mark a cluster that the sample belongs to, where K represents the number of clusters. When K=2, one 2-dimensional cluster vector is initialized, for example, initialized as a vector with all 0s, that is, [0, 0].

Step 22: Separately use the central data as target central data, and obtain a first segment of a target distance between a sample of the N samples and the target central data through local calculation based on a first feature part of the sample of the N samples and the first data part of the target central data; a second segment of the target distance is obtained by the second party. It can be understood that the sum of the first segment of the target distance and the second segment of the target distance is the target distance. The first party calculates the first segment of the target distance, and the second party calculates the second segment of the target distance, so that the target distance is distributed in the first party and the second party through sharing.

In some examples, the local calculation includes: using the first feature part of the sample as a first sub-vector, using the first data part of the target central data as a second sub-vector, calculating a vector distance between the first sub-vector and the second sub-vector, and determining the vector distance as the first segment of the target distance between the sample and the target central data.

For example, for the sample x1 (x1_1, x1_2, x1_3, x1_4, x1_5) and the central data c1 (c1_1, c1_2, c1_3, c1_4, c1_5), the target distance is a distance between the sample x1 and the central data c1. The first party has the first feature part (x1_1, x1_2) of the sample x1 and the first data part (c1_1, c1_2) of the central data c1, and performs calculation of $(x1\_1-c1\_1)^2+(x1\_2-c1\_2)^2$ to obtain the first segment of the target distance, denoted as <x1c1>1. The second party has the second feature part (x1_3, x1_4, x1_5) of the sample x1 and the second data part (c1_3, c1_4, c1_5) of the central data c1, and performs calculation of $(x1\_3-c1\_3)^2+(x1\_4-c1\_4)^2+(x1\_5-c1\_5)^2$ to obtain the second segment of the target distance, denoted as <x1c1>2. The sum of <x1c1>1 and <x1c1>2 is the target distance between x1 and c1, denoted as x1c1.

Similarly, the first party and the second party individually calculate the target distance from the sample x1 to the central data c2. The first party obtains the first segment of the target distance, denoted as <x1c2>1, and the second party obtains the second segment of the target distance, denoted as <x1c2>2. The sum of <x1c2>1 and <x1c2>2 is the target distance between x1 and c2, denoted as x1c2.

Step 23: Determine a shortest target distance among target distances by performing joint comparison using the first segment of each target distance and the second segment of each target distance of the second party through secret sharing. It can be understood that each target distance is a distance between the sample and the central data, and the sum of the first segment of the target distance and the second segment of the target distance is the target distance.

In the embodiments of the present specification, when the number of clusters is two, there are two pieces of central data, and correspondingly, there are two target distances. The shortest target distance among the target distances can be determined by comparing values of the two target distances. For example, values of x1c1 and x1c2 are compared, and a cluster corresponding to the smaller value is the cluster that x1 belongs to. Assuming that x1c2 is the smaller value, it indicates that x1 is closest to c2, and a cluster vector of x1 is changed to [0, 1].

When the number of clusters is more than three, there are more than three pieces of central data, and correspondingly, there are more than three target distances. The shortest target distance among the target distances can be determined by comparing values of two target distances.

In some examples, the joint comparison includes: determining a distance comparison result between the two target distances by performing joint comparison using first segments of two target distances among the target distances and second segments of the two target distances of the second party through secret sharing; and determining the shortest target distance among the target distances based on the distance comparison result.

Step 24: Determine a cluster corresponding to the shortest target distance as a cluster that the sample currently belongs to. It can be understood that in different rounds of iterative processes, the clusters that the same sample belongs to may be different.

In some examples, the method further includes: after determining the cluster corresponding to the shortest target distance as the cluster that the sample currently belongs to, updating, based on a feature mean value corresponding to a dimension in first feature data of samples of the cluster, a data value corresponding to the dimension in a first data part of central data of the cluster.

It can be understood that the same cluster described above is any cluster among the previous K clusters.

For example, the first party and the second party update the central data (c1 and c2) according to the cluster vectors of all samples. Using c1 as an example, the update process is as follows:

The first party calculates a feature mean value corresponding to the first dimension in the first feature data of all samples whose cluster vector is [1, 0], and updates a data value corresponding to the first dimension in the first data part of the central data of the cluster, that is, updates c1_1 of the central data c1; the first party calculates a feature mean value corresponding to the second dimension in the first feature data of all the samples whose cluster vector is [1, 0], and updates a data value corresponding to the second dimension in the first data part of the central data of the cluster, that is, updates c1_2 of the central data c1, so as to obtain the first data part (c1_1, c1_2) of the central data c1 after update.

The second party calculates a feature mean value corresponding to the third dimension in the second feature data of all samples whose cluster vector is [1, 0], and updates a data value corresponding to the third dimension in the second data part of the central data of the cluster, that is, updates c1_3 of the central data c1; the second party calculates a feature mean value corresponding to the fourth dimension in the second feature data of all the samples whose cluster vector is [1, 0], and updates a data value corresponding to the fourth dimension in the second data part of the central data of the cluster, that is, updates c1_4 of the central data c1; the second party calculates a feature mean value corresponding to the fifth dimension in the second feature data of all the samples whose cluster vector is [1, 0], and updates a data value corresponding to the fifth dimension in the second data part of the central data of the cluster, that is, updates c1_5 of the central data c1, so as to obtain the second data part (c1_3, c1_4, c1_5) of the central data c1 after update.

Further, the method further includes: after updating the data value corresponding to the dimension in the first data part of the central data of the cluster, determining whether a change amount of central data of the cluster satisfies a predetermined condition for stopping iteration; and in response to determining that the change amount of the central data of the cluster does not satisfy the predetermined condition for stopping iteration, performing a next round of iteration among the plurality of rounds of iterative processes.

For example, the previous condition for stopping iteration is $|C(t)-C(t+1)|^2<delta$, where delta can be a predetermined value, $C(t)$ represents the central data before update, and $C(t+1)$ represents the central data after update.

Further, the method further includes: in response to determining that the change amount of the central data of the cluster satisfies the predetermined condition for stopping iteration, determining the cluster that a sample currently belongs to as a cluster that the sample finally belongs to.

Further, determining whether the change amount of the central data of the cluster satisfies the predetermined condition for stopping iteration includes: using a cluster of the clusters as a target cluster, using a first data part of central data of the target cluster before update as a third sub-vector, using a first data part of central data of the target cluster after update as a fourth sub-vector, calculating a first vector distance between the third sub-vector and the fourth sub-vector, and determining a first comparison result between the first vector distance and a first threshold; receiving a second comparison result between a second vector distance and a second threshold from the second party, where the second vector distance is a second vector distance between a fifth sub-vector and a sixth sub-vector, and is calculated by the second party using a second data part of the central data of the target cluster before update as the fifth sub-vector and using a second data part of the central data of the target cluster after update as the sixth sub-vector; and in response to the first comparison result showing that the first vector distance is less than or equal to the first threshold, and the second comparison result showing that the second vector distance is less than or equal to the second threshold, determining that a change amount of central data of the target cluster satisfies the predetermined condition for stopping iteration.

It can be understood that in the method for clustering privacy data of a plurality of parties, the first party and the second party have equal status, and the processing procedures of the first party and the second party are not substantially different. In the embodiments of the present specification, the corresponding processing procedures are described mainly by using the first party as the execution body.

According to the method provided in the embodiments of the present specification, no party alone determines the central data of a cluster. Instead, the first party determines the first data part of the central data currently corresponding to a cluster of the K clusters, and the first data part corresponds to the first dimension set. The second party determines the second data part of the central data, and the second data part corresponds to the second dimension set. The first data part of any central data and the second data part of the central data jointly form the central data. In addition, when the target distance between a sample of the N samples and the target central data is determined subsequently, the first party determines the first segment of the target distance through local calculation, and the second party determines the second segment of the target distance through local calculation. When the shortest target distance among the target distances is determined, joint comparison with the second party is performed through secret sharing. Finally, the cluster corresponding to the shortest target distance is determined as the cluster that the sample currently belongs to. The entire process is based on secure multi-party calculations, which can prevent leakage of privacy data when the privacy data of a plurality of parties is clustered.

Figure 3:
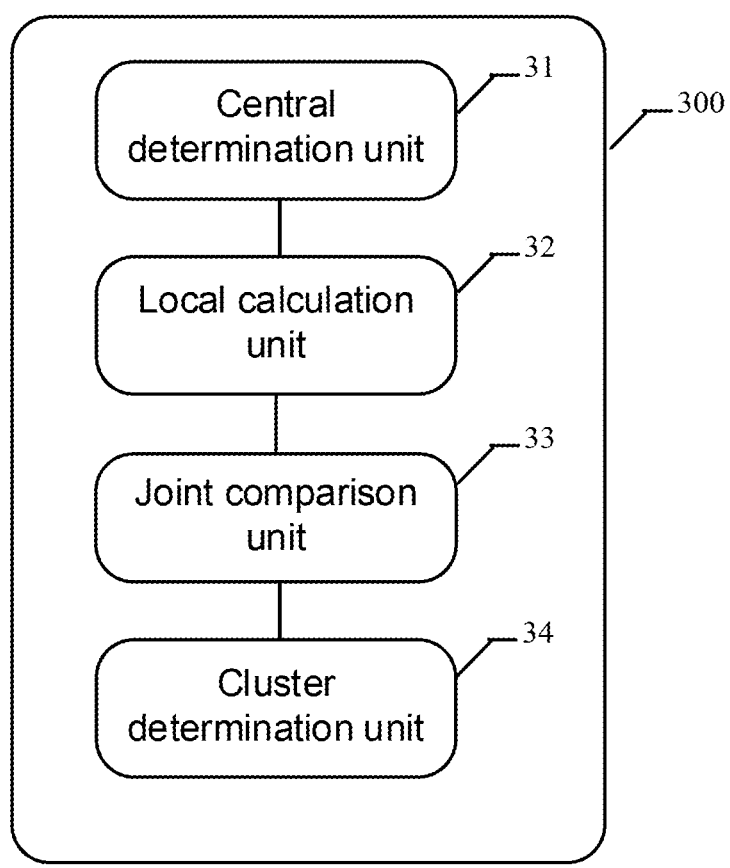
FIG. 3 is a schematic block diagram illustrating an apparatus for clustering privacy data of a plurality of parties according to some embodiments.

According to some embodiments in another aspect, an apparatus for clustering privacy data of a plurality of parties is further provided, and the apparatus is configured to perform the method for clustering privacy data of a plurality of parties provided in the embodiments of the present specification. The plurality of parties includes a first party and a second party; the privacy data of the first party includes a first feature part of N samples, and the first feature part corresponds to a first dimension set; the privacy data of the second party includes a second feature part of the N samples, and the second feature part corresponds to a second dimension set; the apparatus is arranged in the first party, and is configured to perform a plurality of rounds of iterative processes. FIG. 3 is a schematic block diagram illustrating an apparatus for clustering privacy data of a plurality of parties according to some embodiments. As shown in FIG. 3, the apparatus 300 includes the following units for performing any round of iteration: a central determination unit 31, configured to determine a first data part of central data currently corresponding to a cluster of K clusters, where the first data part corresponds to the first dimension set; a second data part of the central data corresponding to the second dimension set belongs to the second party; the first data part of the central data and the second data part of the central data jointly form the central data; a local calculation unit 32, configured to separately use the central data as target central data, and obtain a first segment of a target distance between a sample of the N samples and the target central data through local calculation based on a first feature part of the sample of the N samples and the first data part of the target central data determined by the central determination unit 31; a second segment of the target distance is obtained by the second party; a joint comparison unit 33, configured to determine a shortest target distance among target distances by performing joint comparison using the first segment of each target distance obtained by the local calculation unit 32 and the second segment of each target distance of the second party through secret sharing; and a cluster determination unit 34, configured to determine a cluster corresponding to the shortest target distance determined by the joint comparison unit 33, as a cluster that the sample currently belongs to.

Optionally, in some embodiments, the local calculation unit 32 is specifically configured to use the first feature part of the sample as a first sub-vector, use the first data part of the target central data as a second sub-vector, calculate a vector distance between the first sub-vector and the second sub-vector, and determine the vector distance as the first segment of the target distance between the sample and the target central data.

Optionally, in some embodiments, in a first round of iteration, first data part of the central data corresponding to a cluster of the K clusters is randomly initialized data.

Optionally, in some embodiments, the joint comparison unit 33 includes: a first comparison subunit, configured to determine a distance comparison result between the two target distances by performing joint comparison using first segments of two target distances among the target distances and second segments of the two target distances of the second party through secret sharing; and a first determination subunit, configured to determine the shortest target distance among the target distances based on the distance comparison result obtained by the first comparison subunit.

Optionally, in some embodiments, the apparatus further includes: an updating unit, configured to: after the cluster determination unit 34 determines the cluster corresponding to the shortest target distance as the cluster that the sample currently belongs to, update, based on a feature mean value corresponding to a dimension in first feature data of samples of the cluster, a data value corresponding to the dimension in a first data part of central data of the cluster.

Further, the apparatus further includes: a determination unit, configured to: after the updating unit updates the data value corresponding to the dimension in the first data part of the central data of the cluster, determine whether a change amount of central data of the cluster satisfies a predetermined condition for stopping iteration; and an iteration trigger unit, configured to: in response to a determination result of the determination unit showing that the change amount of the central data of the cluster does not satisfy the predetermined condition for stopping iteration, performing a next round of iteration among the plurality of rounds of iterative processes.

Further, the apparatus further includes: a final determination unit, configured to: in response to a determination result of the determination unit showing that the change amount of the central data of the cluster satisfies the predetermined condition for stopping iteration, determining the cluster that a sample currently belongs to as a cluster that the sample finally belongs to.

Further, the determination unit includes: a second comparison subunit, configured to use a cluster of the clusters as a target cluster, use a first data part of central data of the target cluster before update as a third sub-vector, use a first data part of central data of the target cluster after update as a fourth sub-vector, calculate a first vector distance between the third sub-vector and the fourth sub-vector, and determine a first comparison result between the first vector distance and a first threshold; a receiving subunit, configured to receive a second comparison result between a second vector distance and a second threshold from the second party, where the second vector distance is a second vector distance between a fifth sub-vector and a sixth sub-vector, and is calculated by the second party using a second data part of the central data of the target cluster before update as the fifth sub-vector and using a second data part of the central data of the target cluster after update as the sixth sub-vector; and a second determination subunit, configured to: in response to the first comparison result determined by the second comparison subunit showing that the first vector distance is less than or equal to the first threshold, and the second comparison result received by the receiving subunit showing that the second vector distance is less than or equal to the second threshold, determining that a change amount of central data of the target cluster satisfies the predetermined condition for stopping iteration.

According to the apparatus provided in the embodiments of the present specification, no party alone determines the central data of a cluster. Instead, the central determination unit 31 of the first party determines the first data part of the central data currently corresponding to a cluster of the K clusters, and the first data part corresponds to the first dimension set. The second party determines the second data part of the central data, and the second data part corresponds to the second dimension set. The first data part of any central data and the second data part of the central data jointly form the central data. In addition, when the target distance between a sample of the N samples and the target central data is determined subsequently, the local calculation unit 32 of the first party determines the first segment of the target distance through local calculation, and the second party determines the second segment of the target distance through local calculation. When the shortest target distance among the target distances is determined, the joint comparison unit 33 performs joint comparison with the second party through secret sharing. Finally, the cluster determination unit 34 determines the cluster corresponding to the shortest target distance as the cluster that the sample currently belongs to. The entire process is based on secure multi-party calculations, which can prevent leakage of privacy data when the privacy data of a plurality of parties is clustered.

According to some embodiments in another aspect, a computer-readable storage medium is further provided, where the computer-readable storage medium stores a computer program, and when the computer program is executed in a computer, the computer is enabled to perform the method described with reference to FIG. 2.

According to some embodiments in yet another aspect, a computing device is further provided, including a memory and a processor, where the memory stores executable code, and the processor executes the executable code to implement the method described with reference to FIG. 2.

A person skilled in the art should be aware that in the previous one or more examples, functions described in the present disclosure can be implemented by hardware, software, firmware, or any combination thereof. When these functions are implemented by software, they can be stored in a computer-readable medium or transmitted as one or more instructions or code on the computer-readable medium.

The previous specific implementations further describe the purposes, technical solutions and beneficial effects of the present invention. It should be understood that the previous descriptions are merely specific implementations of the present disclosure and are not intended to limit the protection scope of the present invention. Any modification, equivalent replacement and improvement made based on the technical solutions of the present disclosure shall fall within the protection scope of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for clustering privacy data of a plurality of parties through machine learning, the plurality of parties including a first party and a second party, privacy data of the first party including a first feature part of a sample, and the first feature part corresponding to a first dimension set; privacy data of the second party including a second feature part of the sample, and the second feature part corresponding to a second dimension set; the method comprising:
   determining a first data part of central data corresponding to a cluster of K clusters, wherein the first data part corresponds to the first dimension set, and a second data part of the central data corresponding to the second dimension set belongs to the second party;
   separately using central data of a cluster of the K clusters as target central data, and obtaining a first segment of a target distance including a vector distance between the sample and the target central data through local calculation of machine learning based on a first feature part of the sample and the first data part of the target central data, wherein a second segment of the target distance is obtained by the second party;
   determining a shortest target distance among target distances of the sample to the central data of the K clusters by performing joint comparison using the first segment of each target distance and the second segment of each target distance through secret sharing; and determining, among the K clusters, a cluster corresponding to the shortest target distance as a cluster that the sample belongs to.

2. The method according to claim 1, wherein the local calculation includes:
   using the first feature part of the sample as a first sub-vector;
   using the first data part of the target central data as a second sub-vector;
   calculating the vector distance between the first sub-vector and the second sub-vector; and
   determining the vector distance as the first segment of the target distance between the sample and the target central data.

3. The method according to claim 1, wherein the method includes a plurality of rounds of iterations, and in a first round of iteration of the plurality of rounds of iterations, first data part of the central data corresponding to a cluster of the K clusters is randomly initialized data.

4. The method according to claim 1, wherein the joint comparison includes:
   determining a distance comparison result between two target distances by performing joint comparison using first segments of the two target distances among the target distances and second segments of the two target distances of the second party through secret sharing; and
   determining the shortest target distance among the target distances based on the distance comparison result.

5. The method according to claim 1, further comprising:
   after the determining the cluster corresponding to the shortest target distance as the cluster that the sample belongs to, updating, based on a feature mean value corresponding to a dimension in first feature data of samples of the cluster, a data value corresponding to the dimension in a first data part of central data of the cluster.

6. The method according to claim 5, wherein the method includes a plurality of rounds of iterations, and the method further comprises:
   after the updating the data value corresponding to the dimension in the first data part of the central data of the cluster, determining whether a change amount of central data of a cluster satisfies a threshold for stopping iteration;
   in response to determining that the change amount of the central data of the cluster does not satisfy the threshold for stopping iteration, performing a next round of iteration among the plurality of rounds of iterations; and
   in response to determining that the change amount of the central data of the cluster satisfies the threshold for stopping iteration, determining the cluster that the sample currently belongs to as a cluster that the sample finally belongs to.

7. The method according to claim 6, wherein the determining whether the change amount of the central data of the cluster satisfies the threshold for stopping iteration includes:
   using a cluster of the clusters as a target cluster, using a first data part of central data of the target cluster before update as a third sub-vector, using a first data part of central data of the target cluster after update as a fourth sub-vector, calculating a first vector distance between the third sub-vector and the fourth sub-vector, and determining a first comparison result between the first vector distance and a first threshold;
   receiving a second comparison result between a second vector distance and a second threshold from the second party, wherein the second vector distance is a second vector distance between a fifth sub-vector and a sixth sub-vector, and is calculated by the second party using a second data part of the central data of the target cluster before update as the fifth sub-vector and using a second data part of the central data of the target cluster after update as the sixth sub-vector; and
   in response to the first comparison result showing that the first vector distance is less than or equal to the first threshold, and the second comparison result showing that the second vector distance is less than or equal to the second threshold, determining that a change amount of central data of the target cluster satisfies a predetermined condition for stopping iteration.

8. An apparatus for clustering privacy data of a plurality of parties through machine learning, the plurality of parties including a first party and a second party, privacy data of the first party including a first feature part of a sample, and the first feature part corresponding to a first dimension set; privacy data of the second party including a second feature part of the sample, and the second feature part corresponding to a second dimension set; the apparatus comprising:
   a central determination unit, configured to determine a first data part of central data corresponding to a cluster of K clusters, wherein the first data part corresponds to the first dimension set, and a second data part of the central data corresponding to the second dimension set belongs to the second party;
   a local calculation unit, configured to separately use the central data as target central data, and obtain a first segment of a target distance including a vector distance between the sample and the target central data through local calculation of machine learning based on a first feature part of the sample and the first data part of the target central data determined by the central determination unit, and a second segment of the target distance is obtained by the second party;
   a joint comparison unit, configured to determine a shortest target distance among target distances by performing joint comparison using the first segment of each target distance obtained by the local calculation unit and the second segment of each target distance of the second party through secret sharing; and
   a cluster determination unit, configured to determine, among the K clusters, a cluster corresponding to the shortest target distance determined by the joint comparison unit, as a cluster that the sample belongs to.

9. The apparatus according to claim 8, wherein the local calculation unit is configured to:
   use the first feature part of the sample as a first sub-vector;
   use the first data part of the target central data as a second sub-vector;
   calculate the vector distance between the first sub-vector and the second sub-vector; and
   determine the vector distance as the first segment of the target distance between the sample and the target central data.

10. The apparatus according to claim 8, wherein the apparatus is configured to perform a plurality of rounds of iterations, and in a first round of iteration of the plurality of rounds of iterations, first data part of the central data corresponding to a cluster of the K clusters is randomly initialized data.

11. The apparatus according to claim 8, wherein the joint comparison unit includes:
- a first comparison subunit, configured to determine a distance comparison result between two target distances by performing joint comparison using first segments of the two target distances among the target distances and second segments of the two target distances of the second party through secret sharing; and
- a first determination subunit, configured to determine the shortest target distance among the target distances based on the distance comparison result obtained by the first comparison subunit.

12. The apparatus according to claim 8, further comprising:
- an updating unit, configured to:
- after the cluster determination unit determines the cluster corresponding to the shortest target distance as the cluster that the sample belongs to, update, based on a feature mean value corresponding to a dimension in first feature data of samples of the cluster, a data value corresponding to the dimension in a first data part of central data of the cluster.

13. The apparatus according to claim 12, wherein the apparatus is configured to perform a plurality of rounds of iterations, and the apparatus further comprises:
- a determination unit, configured to, after the updating unit has updated the data value corresponding to the dimension in the first data part of the central data of the cluster, determine whether a change amount of central data of the cluster satisfies a threshold for stopping iteration;
- an iteration trigger unit, configured to, in response to a determination result of the determination unit showing that the change amount of the central data of the cluster does not satisfy the threshold for stopping iteration, perform a next round of iteration among the plurality of rounds of iteration; and
- a final determination unit, configured to, in response to a determination result of the determination unit showing that the change amount of the central data of the cluster satisfies the threshold for stopping iteration, determine the cluster that the sample currently belongs to as a cluster that the sample finally belongs to.

14. The apparatus according to claim 13, wherein the determination unit includes:
- a second comparison subunit, configured to use a cluster of the clusters as a target cluster, use a first data part of central data of the target cluster before update as a third sub-vector, use a first data part of central data of the target cluster after update as a fourth sub-vector, calculate a first vector distance between the third sub-vector and the fourth sub-vector, and determine a first comparison result between the first vector distance and a first threshold;
- a receiving subunit, configured to receive a second comparison result between a second vector distance and a second threshold from the second party, wherein the second vector distance is a second vector distance between a fifth sub-vector and a sixth sub-vector, and is calculated by the second party using a second data part of the central data of the target cluster before update as the fifth sub-vector and using a second data part of the central data of the target cluster after update as the sixth sub-vector; and
- a second determination subunit, configured to, in response to the first comparison result determined by the second comparison subunit showing that the first vector distance is less than or equal to the first threshold, and the second comparison result received by the receiving subunit showing that the second vector distance is less than or equal to the second threshold, determining that a change amount of central data of the target cluster satisfies a predetermined condition for stopping iteration.

15. A computing device, comprising a memory and a processor, the memory storing executable code, and the processor executing the executable code to implement acts including:
- determining a first data part of central data corresponding to a cluster of K clusters, the first data part corresponding to a first dimension set, the first data part of central data belongs to a first party, the first party having first privacy data including a first feature part of a sample, and the first feature part corresponding to the first dimension set, wherein a second data part of the central data corresponding to a second dimension set belongs to a second party, the second party having second privacy data including a second feature part of the sample, and the second feature part corresponding to the second dimension set;
- separately using central data of a cluster of the K clusters as target central data, and obtaining a first segment of a target distance including a vector distance between the sample and the target central data through local calculation of machine learning based on a first feature part of the sample and the first data part of the target central data, wherein a second segment of the target distance is obtained by the second party;
- determining a shortest target distance among target distances of the sample to the central data of the K clusters by performing joint comparison using the first segment of each target distance and the second segment of each target distance through secret sharing; and
- determining, among the K clusters, a cluster corresponding to the shortest target distance as a cluster that the sample belongs to.

16. The computing device according to claim 15, wherein the local calculation includes:
- using the first feature part of the sample as a first sub-vector;
- using the first data part of the target central data as a second sub-vector;
- calculating the vector distance between the first sub-vector and the second sub-vector; and
- determining the vector distance as the first segment of the target distance between the sample and the target central data.

17. The computing device according to claim 15, wherein the acts are implemented in a plurality of rounds of iterations, and in a first round of iteration of the plurality of rounds of iterations, first data part of the central data corresponding to a cluster of the K clusters is randomly initialized data.

18. The computing device according to claim 15, wherein the joint comparison includes:
- determining a distance comparison result between two target distances by performing joint comparison using first segments of the two target distances among the target distances and second segments of the two target distances of the second party through secret sharing; and
- determining the shortest target distance among the target distances based on the distance comparison result.

19. The computing device according to claim 15, wherein the acts further include:
- after the determining the cluster corresponding to the shortest target distance as the cluster that the sample belongs to, updating, based on a feature mean value corresponding to a dimension in first feature data of samples of the cluster, a data value corresponding to the dimension in a first data part of central data of the cluster.

20. The computing device according to claim 19, wherein the acts are implemented in a plurality of rounds of iterations, and the acts further comprise:
- after the updating the data value corresponding to the dimension in the first data part of the central data of the cluster, determining whether a change amount of central data of a cluster satisfies a threshold for stopping iteration;
- in response to determining that the change amount of the central data of the cluster does not satisfy the threshold for stopping iteration, performing a next round of iteration among the plurality of rounds of iterations; and
- in response to determining that the change amount of the central data of the cluster satisfies the threshold for stopping iteration, determining the cluster that the sample currently belongs to as a cluster that the sample finally belongs to.

\* \* \* \* \*